(12) United States Patent
Koo et al.

(10) Patent No.: US 12,008,379 B2
(45) Date of Patent: Jun. 11, 2024

(54) AUTOMOTIVE IMAGE SENSOR, IMAGE PROCESSING SYSTEM INCLUDING THE SAME AND OPERATING METHOD THEREOF

(71) Applicant: SAMSUNG ELECTRONICS CO., LTD., Suwon-si (KR)

(72) Inventors: Sigyoung Koo, Suwon-si (KR); Donghyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 17/568,219

(22) Filed: Jan. 4, 2022

(65) Prior Publication Data

US 2022/0365788 A1 Nov. 17, 2022

(30) Foreign Application Priority Data

May 14, 2021 (KR) .................. 10-2021-0062649
Jul. 20, 2021 (KR) .................. 10-2021-0094683

(51) Int. Cl.
*G06F 15/177* (2006.01)
*G06F 9/00* (2006.01)
(Continued)

(52) U.S. Cl.
CPC ............ *G06F 9/4401* (2013.01); *G06F 21/44* (2013.01); *H04L 9/30* (2013.01); *H04L 9/3249* (2013.01)

(58) Field of Classification Search
CPC ........ G06F 9/4401; G06F 21/44; G06F 21/64; H04L 9/30; H04L 9/3249; H04L 9/3271;
(Continued)

(56) References Cited

U.S. PATENT DOCUMENTS 8,112,618 B2 * 2/2012 Brokish .............. G06F 12/1009 713/1
8,683,213 B2 3/2014 Prabhakaran et al.
(Continued)

FOREIGN PATENT DOCUMENTS

CN 106170772 A 11/2016
EP 3 095 034 A2 7/2016
(Continued)

OTHER PUBLICATIONS

Communication dated Sep. 15, 2022, issued by the European Patent Office in counterpart European Application No. 22166708.2.

*Primary Examiner* — Xuxing Chen
(74) *Attorney, Agent, or Firm* — Sughrue Mion, PLLC

(57) ABSTRACT

Provided is a method of operating an automotive image sensor, the method including performing a reset operation to set an initialization register corresponding to operation information of the automotive image sensor, receiving a device authentication request from an electronic control unit after performing the reset operation, performing an authentication operation with the electronic control unit based on the device authentication request, obtaining first image data while performing the authentication operation, transmitting the first image data to the electronic control unit while performing the authentication operation, obtaining second image data after the authentication operation is completed, generating a tag for the second image data, and transmitting the second image data and the tag to the electronic control unit.

20 Claims, 15 Drawing Sheets

(51) Int. Cl.
*G06F 9/4401* (2018.01)
*G06F 21/44* (2013.01)
*H04L 9/30* (2006.01)
*H04L 9/32* (2006.01)

(58) Field of Classification Search
CPC ... H04L 2209/84; H04L 63/123; H04L 9/302; H04L 9/3213; H04N 25/00
See application file for complete search history.

(56) References Cited

U.S. PATENT DOCUMENTS

| | | | |
|---|---|---|---|
| 9,294,498 | B1 | 3/2016 | Yampolskiy et al. |
| 9,746,985 | B1 | 8/2017 | Humayun et al. |
| 9,781,149 | B1 | 10/2017 | Himler et al. |
| 9,912,687 | B1 | 3/2018 | Wescoe et al. |
| 9,936,085 | B2 | 4/2018 | Yoshiura et al. |
| 10,243,904 | B1 | 3/2019 | Wescoe et al. |
| 10,257,219 | B1 | 4/2019 | Geil et al. |
| 10,546,135 | B1 | 1/2020 | Kassoumeh et al. |
| 10,616,266 | B1 | 4/2020 | Otvagin |
| 2006/0242416 | A1* | 10/2006 | Sharma ............... G06T 1/005 713/176 |
| 2012/0258437 | A1 | 10/2012 | Sadeh-Koniecpol et al. |
| 2013/0203023 | A1 | 8/2013 | Sadeh-Koniecpol et al. |
| 2014/0109182 | A1 | 4/2014 | Smith et al. |
| 2014/0199663 | A1 | 7/2014 | Sadeh-Koniecpol et al. |
| 2014/0199664 | A1 | 7/2014 | Sadeh-Koniecpol et al. |
| 2015/0288712 | A1 | 10/2015 | Jones et al. |
| 2016/0036829 | A1 | 2/2016 | Sadeh-Koniecpol et al. |
| 2016/0112443 | A1 | 4/2016 | Grossman et al. |
| 2016/0173521 | A1 | 6/2016 | Yampolskiy et al. |
| 2016/0248797 | A1 | 8/2016 | Yampolskiy et al. |
| 2016/0301716 | A1 | 10/2016 | Sadeh-Koniecpol et al. |
| 2017/0048267 | A1 | 2/2017 | Yampolskiy et al. |
| 2017/0058565 | A1 | 3/2017 | Sanchez et al. |
| 2017/0103674 | A1 | 4/2017 | Sadeh-Koniecpol et al. |
| 2017/0104778 | A1 | 4/2017 | Shabtai et al. |
| 2017/0126712 | A1 | 5/2017 | Crabtree et al. |
| 2017/0140663 | A1 | 5/2017 | Sadeh-Koniecpol et al. |
| 2017/0236078 | A1 | 8/2017 | Rasumov |
| 2017/0237764 | A1 | 8/2017 | Rasumov |
| 2017/0244746 | A1 | 8/2017 | Hawthorn et al. |
| 2017/0322682 | A1 | 11/2017 | Humayun et al. |
| 2017/0324768 | A1 | 11/2017 | Crabtree et al. |
| 2018/0013771 | A1 | 1/2018 | Crabtree et al. |
| 2018/0018463 | A1 | 1/2018 | Grossman et al. |
| 2018/0025433 | A1 | 1/2018 | Crabtree et al. |
| 2018/0103052 | A1 | 4/2018 | Choudhury et al. |
| 2018/0146004 | A1 | 5/2018 | Belfiore, Jr. et al. |
| 2018/0176243 | A1 | 6/2018 | Arnaldo et al. |
| 2018/0219894 | A1 | 8/2018 | Crabtree et al. |
| 2018/0219919 | A1 | 8/2018 | Crabtree et al. |
| 2018/0241767 | A1 | 8/2018 | Crabtree et al. |
| 2018/0295154 | A1 | 10/2018 | Crabtree et al. |
| 2018/0332064 | A1 | 11/2018 | Harris et al. |
| 2018/0357422 | A1 | 12/2018 | Telang et al. |
| 2019/0034637 | A1* | 1/2019 | Cho ..................... H04L 63/08 |
| 2019/0034845 | A1 | 1/2019 | Mo et al. |
| 2019/0034846 | A1 | 1/2019 | Mo et al. |
| 2019/0092280 | A1 | 3/2019 | Oesterling et al. |
| 2019/0097805 | A1 | 3/2019 | Shin et al. |
| 2019/0147378 | A1 | 5/2019 | Mo et al. |
| 2019/0173819 | A1 | 6/2019 | Wescoe et al. |
| 2019/0222597 | A1 | 7/2019 | Crabtree et al. |
| 2019/0311220 | A1 | 10/2019 | Hazard et al. |
| 2020/0244442 | A1 | 7/2020 | Zeh et al. |
| 2020/0266785 | A1 | 8/2020 | Jung et al. |
| 2020/0358808 | A1 | 11/2020 | Yampolskiy et al. |
| 2022/0360443 | A1* | 11/2022 | Kang ..................... H04L 9/321 |

FOREIGN PATENT DOCUMENTS

| | | |
|---|---|---|
| EP | 3 338 205 A1 | 1/2018 |
| EP | 3 280 112 A1 | 2/2018 |
| EP | 3 462 747 A1 | 4/2019 |
| EP | 3 477 521 A1 | 5/2019 |
| KR | 10-1210723 B1 | 12/2012 |
| KR | 10-1534192 B1 | 7/2015 |
| KR | 10-1534194 B1 | 7/2015 |
| KR | 10-1732682 B1 | 5/2017 |
| KR | 10-1753114 B1 | 7/2017 |
| KR | 10-2220746 B1 | 2/2021 |

\* cited by examiner

AUTOMOTIVE IMAGE SENSOR, IMAGE PROCESSING SYSTEM INCLUDING THE SAME AND OPERATING METHOD THEREOF

CROSS TO REFERENCE TO RELATED APPLICATIONS

This application claims benefit of priority to Korean Patent Application Nos. 10-2021-0062649 filed on May 14, 2021 and 10-2021-0094683 filed on Jul. 20, 2021 in the Korean Intellectual Property Office, the disclosures of which are incorporated herein by reference in their entireties.

BACKGROUND

Example embodiments of the present disclosure relate to an automotive image sensor, an image processing system including the same, and an operating method thereof.

Generally, in the automotive-IT convergence field, advanced driver assistance systems (ADAS) refers to various systems which may allow a driver to take an appropriate action based on external environmental information detected by a vehicle sensor and a camera, or may automatically control a vehicle such that a safe driving environment may be established to reduce or prevent damages caused by vehicle accidents. An ADAS may be used to warn a driver by monitoring departure from a lane when the departure occurs, to help maintain an appropriate distance by sensing a distance between vehicles, to illuminate a road according to a driving direction at night, and to sense drowsiness of a driver and warn the driver. As such, an ADAS may be an advanced driver assistance system fundamental to ensuring driver safety and convenience to implement autonomous vehicles. Therefore, the importance of sensors for an ADAS has been increased.

SUMMARY

One or more example embodiments provide an automotive image sensor which may safely obtain images, an image processing system including the same, and an operating method thereof.

One or more example embodiments also provide an automotive image sensor which may be quickly booted, an image processing system including the same, and an operating method thereof.

According to an aspect of an example embodiment, there is provided a method of operating an automotive image sensor, the method including performing a reset operation to set an initialization register corresponding to operation information of the automotive image sensor, receiving a device authentication request from an electronic control unit after performing the reset operation, performing an authentication operation with the electronic control unit based on the device authentication request, obtaining first image data while performing the authentication operation, transmitting the first image data to the electronic control unit while performing the authentication operation, obtaining second image data after the authentication operation is completed, generating a tag for the second image data, and transmitting the second image data and the tag to the electronic control unit.

According to another aspect of an example embodiment, there is provided an automotive image sensor including a pixel array including a plurality of pixels provided in a plurality of row lines and a plurality of column lines, a row driver configured to select one of the plurality of row lines, an analog-to-digital conversion circuit configured to convert analog signals output by the pixel array into digital data by comparing the analog signals with a ramp signal, a ramp signal generator configured to generate the ramp signal, a buffer memory configured to store the digital data, a digital processing device configured to process the digital data into image data, a timing controller configured to control the pixel array, the row driver, the analog-to-digital conversion circuit, the ramp signal, the buffer memory, and the digital processing device, and a security circuit configured to perform device authentication with an external electronic control unit and to generate a tag for all of the image data or a portion of the image data based on key information corresponding to the device authentication, wherein the digital processing device transmits the image data to an electronic control unit while performing the device authentication.

According to another aspect of an example embodiment, there is provided an image processing system including an automotive image sensor configured to obtain an image, and an electronic control unit configured to receive image data from the automotive image sensor and to process the image data, wherein the electronic control unit includes at least one processor configured to be implemented as a boot mode selector configured to select one of a normal boot mode and a quick boot mode, and a security module configured to perform device authentication based on the automotive image sensor and verify integrity of the image data received from the automotive image sensor, wherein, in the normal boot mode, an initial setting operation of the automotive image sensor is requested after the device authentication is performed by the automotive image sensor, and wherein, in the quick boot mode, the initial setting operation of the automotive image sensor is requested after the initial setting operation of the automotive image sensor is performed.

According to another aspect of an example embodiment, there is provided a method of operating an electronic control unit, the method including transmitting an authentication request to an automotive image sensor through a communication channel after receiving operation information from the automotive image sensor, receiving a public key of the automotive image sensor from the automotive image sensor through a communication channel, generating an encryption code based on the public key, transmitting the encryption code to the automotive image sensor through the communication channel, receiving first stream data from the automotive image sensor through a transmission channel before an authentication operation is completed, and receiving second stream data from the automotive image sensor through the transmission channel after the authentication operation is completed.

BRIEF DESCRIPTION OF DRAWINGS

The above and/or other aspects, features, and advantages of example embodiments will be more clearly understood from the following detailed description, taken in conjunction with the accompanying drawings, in which.

DETAILED DESCRIPTION

Hereinafter, example embodiments of the present disclosure will be described as below with reference to the accompanying drawings.

Figure 1:
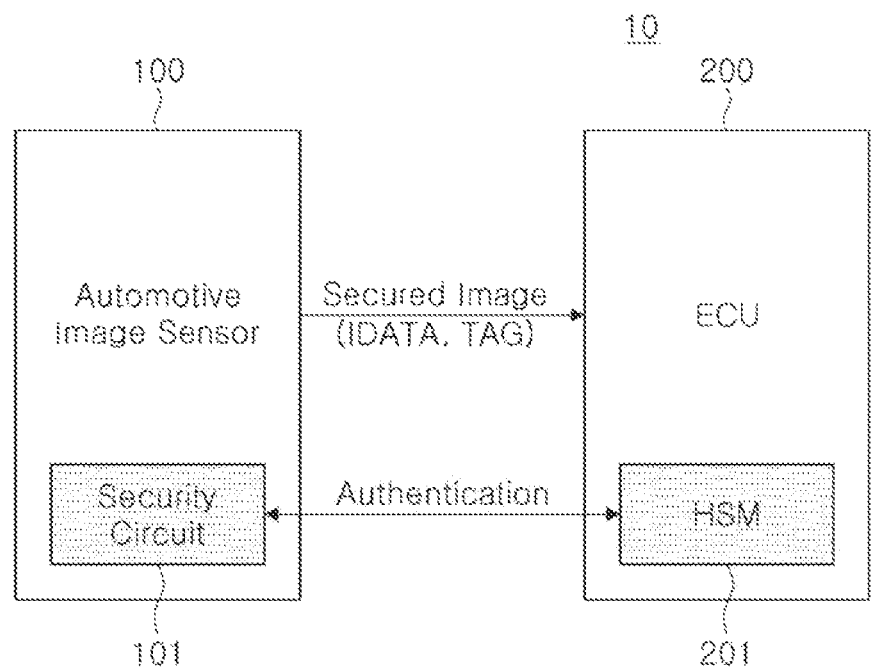
FIG. 1 is a diagram illustrating an image processing system according to an example embodiment.

FIG. 1 is a diagram illustrating an image processing system 10 according to an example embodiment. Referring to FIG. 1, the image processing system 10 may include an automotive image sensor 100 and an electronic control unit 200 (ECU). The automotive image sensor 100 may be implemented by a camera device performing an imaging operation using a camera lens. The image processing system 10 may be applied to various types of systems. For example, the image processing system 10 may be applied to an autonomous driving system.

The automotive image sensor 100 may be configured to obtain an image from surroundings of a vehicle. The automotive image sensor 100 may also be configured to convert the obtained image into a secured image guaranteeing reliability and to transmit the converted secured image to the electronic control unit 200. In an example embodiment, the secured image may include original data and a tag for verifying reliability of the original data. In another example embodiment, the secured image may include an image encrypted based on an encryption algorithm.

The automotive image sensor 100 may also include a security circuit 101 configured to perform a series of security operations necessary to convert the obtained image into a secured image. The security circuit 101 may be configured in software, hardware, or firmware.

The security circuit 101 may be configured to perform an authentication operation with the electronic control unit 200. The authentication operation may be performed based on various algorithms. In an example embodiment, the authentication procedure may be performed based on an asymmetric-key algorithm such as Rivest Shamir Adleman (RSA), elliptic curve cryptography (ECC), and Diffie-Hellman. In another example embodiment, the authentication procedure may be performed based on a symmetric-key algorithm such as advanced encryption standard (AES) or data encryption standard (DES).

In an example embodiment, the authentication operation may be initiated after an operation of setting the automotive image sensor 100. In particular, while the authentication operation is performed, the image obtained from the automotive image sensor 100 may be transmitted to the electronic control unit 200. In this case, the image transmitted simultaneously with the authentication operation may not include a tag for reliability verification.

The security circuit 101 may also be configured to perform a security processing operation on the image to identify whether the image transmitted from the electronic control unit 200 is forged. For example, the security circuit 101 may generate a tag TAG for the obtained image, and may perform a security processing operation of transmitting the obtained image data DATA and the tag TAG attached thereto. In an example embodiment, the security circuit 101 may generate a tag, a message authentication code (MAC), for example, using an image and key information (shared key information), and may transmit the generated MAC to the electronic control unit 200 along with a corresponding image.

In an example embodiment, the security circuit 101 may select only a partial area from one of images, and may generate a MAC using data and key information of the image of the selected area. In an example embodiment, the partial area of the image used to generate the MAC may be arbitrarily selected by the automotive image sensor 100. In another example embodiment, the partial area of the image used to generate the MAC may be provided from the electronic control unit 200 to the automotive image sensor 100. The position of the area of the image used to generate the MAC may change according to various methods. For example, an area of a fixed position may be used, or the position of an area of an image for generating a MAC may change for each frame or periodically.

The electronic control unit 200 (ECU) may be configured to receive an image (or image data) transmitted from the automotive image sensor 100 and to perform a processing operation thereon. For example, the electronic control unit 200 may be configured as a semiconductor chip configured separately from the automotive image sensor 100. In an example embodiment, the semiconductor chip may be a system on chip (SoC) in which at least one processor and an image processing module are integrated. For example, the electronic control unit 200 may be configured as an advanced driver assistance system (ADAS) SOC.

In an example embodiment, the electronic control unit 200 may obtain a MAC using the received image and key information, and may verify integrity of the image transmitted from the automotive image sensor 100 by comparing the MAC transmitted from the automotive image sensor 100 with a MAC calculated by the electronic control unit 200. In another example embodiment, the electronic control unit 200 may select an area of the same position from the received image, may obtain a MAC using image data and key information of the selected area, and may verify integrity of the image by comparing the MAC transmitted from the automotive image sensor 100 with the MAC calculated by the electronic control unit 200.

The electronic control unit 200 may also communicate with an external electronic control unit by various communication methods such as controller area network (CAN), media oriented system transport (MOST), local interconnected network (LIN), FlexRay, Ethernet, or the like.

In the image processing system 10 illustrated in FIG. 1, a single electronic control unit 200 and a single automotive image sensor 100 are illustrated, but embodiments are not limited thereto. The image processing system 10 according to an example embodiment may be implemented in other various forms. For example, the image processing system 10 may include two or more electronic control units 200 and the number of automotive image sensors 100 included in the image processing system 10 may be varied.

When the image processing system 10 is implemented as an autonomous driving system, a plurality of camera devices may be employed in a vehicle. The amount of image data transmitted by the camera sensor of each camera device may be 6 to 12 Gbps. However, the amount of data transmitted from the camera sensor may not be limited thereto.

The electronic control unit 200 may, by analyzing a large amount of images received from each camera sensor, interpret a current traffic situation and obstacles based the analysis, and may execute device control for a subsequent operation in real time. The electronic control unit 200 may also perform a security processing operation to check whether the image is transmitted from a legitimate camera device and whether the image is not forged while the image is transmitted.

The electronic control unit 200 may include a security module 201 (hardware security module; HSM) configured to perform the device authentication operation and the image integrity verification operation of the automotive image sensor 100 described above. The security module 101 may be implemented in software, hardware, or firmware.

A hardware security module (HSM) may refer to a cryptographic processor specially designed for protecting a lifecycle of an encryption key. The HSM may perform cryptographic processing, key protection, and key management within an enhanced anti-counterfeiting device. An HSM used in a vehicle controller domain may include a secure memory for safely storing a key. For example, the secure memory may include an HSM dedicated random access memory (RAM) or a read only memory (ROM) with high security, separate from the host system. The HSM may perform a series of operations through a dedicated central processing unit (CPU) to perform functions relatively safely from attacks by potential attackers.

In the image processing system, the automotive image sensor 100 and the electronic control unit 200 may perform a device authentication procedure before an actual image is transmitted. Such a device authentication procedure may be performed when the automotive image sensor 100 is initially driven or booted. A general image processing system may require a significant amount of time to transmit a secured image after the device authentication procedure is performed. Accordingly, a customer who uses the image processing system may experience visual discomfort.

The image processing system 10 in an example embodiment may perform the device authentication procedure in the initialization operation of the automotive image sensor 100 and may transmit the obtained image to the electronic control unit 200 simultaneously, such that the user convenience may improve.

Figure 2:
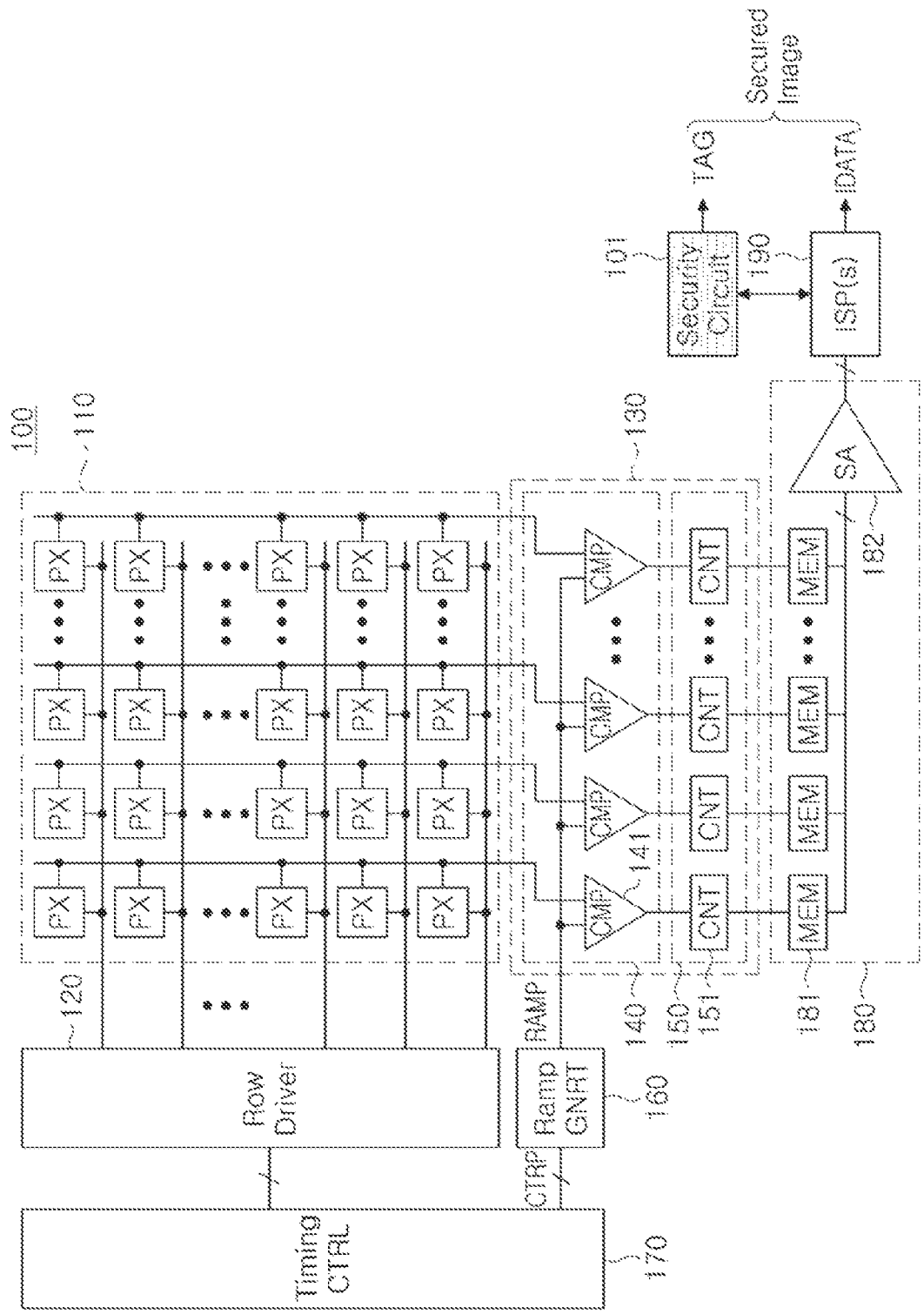
FIG. 2 is a diagram illustrating an automotive image sensor according to an example embodiment.

FIG. 2 is a diagram illustrating an automotive image sensor 100 according to an example embodiment. Referring to FIG. 2, the automotive image sensor 100 may include a security circuit 101, a pixel array 110, a row driver 120, an analog-to-digital conversion circuit 130, a lamp voltage generator 160, and a timing controller 170, a buffer 180, and a digital processing device 190 (image signal processor(s) (ISP(s))).

The security circuit 101 may be configured to perform a device authentication procedure with the external electronic control unit 200 or to generate a tag corresponding to an obtained image.

The pixel array 110 may include a plurality of pixels arranged in a matrix form, each of which is connected to a plurality of row lines and a plurality of column lines CL. Each of the plurality of pixels may include a photosensing device. For example, the photosensing device may include a photodiode, a phototransistor, a port gate, or a pinned photodiode. Each of the plurality of pixels may include at least one photosensing device. In an example embodiment, each of the plurality of pixels may include a plurality of photosensing devices. The plurality of photosensing devices may be stacked on each other.

Each of the plurality of pixels may sense light using the photosensing device, and may convert light into a pixel signal which may be an electrical signal. Each of the plurality of pixels may sense light in a specific spectral region. For example, the plurality of pixels may include a red pixel for converting light in a red spectral region into an electrical signal, a green pixel for converting light in a green spectral region into an electrical signal, and a blue pixel for converting light in a blue spectral region into an electrical signal. A color filter for transmitting light of a specific spectral region may be disposed on each of the plurality of pixels.

Each of the plurality of pixels may be configured to operate both a signal dump operation and a readout operation using a single source follower transistor.

The row driver 120 may be configured to drive the pixel array 110 in a row unit. The row driver 120 may decode a row control signal (e.g., an address signal) generated by the timing controller 170, and may select at least one of the row lines included in the pixel array 110 in response to the decoded row control signal. For example, the row driver 120 may generate a row selection signal. The pixel array 110 may also output a pixel signal from a row selected by the row selection signal provided by the row driver 120. The pixel signal may include a reset signal and an image signal.

The analog-to-digital conversion (ADC) circuit 130 may be configured to convert an analog pixel signal input from the pixel array 110 into digital data in response to the ADC activation signal ADC_EN. The analog-to-digital conversion circuit 130 may include a comparison circuit 140 (CDB) and a counter circuit 150 (DBS).

The comparison circuit 140 may be configured to compare a pixel signal output by a unit pixel connected to one of the column lines CL included in the pixel array 110 with the ramp voltage RAMP. The comparison circuit 140 may include a plurality of comparators 141 provided to correspond to each column. Each comparator 141 may be connected to the pixel array 110 and the ramp voltage generator 160.

The comparator 141 (CMP) may be configured to compare the pixel signal with the received ramp voltage RAMP generated by the ramp voltage generator 160, and to output a comparison result signal to an output terminal. The comparator 141 may also generate a comparison result signal to which a correlated double sampling (CDS) technique is applied. Pixel signals output by the plurality of pixels may have a deviation between unique properties (e.g., fixed pattern noise (FPN)) of the pixels, or a deviation caused by a difference between properties of logics for outputting a pixel signal from the pixel PX. The correlated double sampling technique is directed to calculating or obtaining a reset component (or a reset signal) and an image component (or an image signal) for each of the pixel signals to compensate for the deviation between the pixel signals, and extracting the difference as a valid signal component. The comparator 141 may output a comparison result signal to which the correlated double sampling technique is applied.

The comparator 141 may also be configured as a two-stage amplifier. For example, the comparator 141 may include a first amplifier for comparing the pixel signal with the ramp voltage, and a second amplifier for amplifying an output of the first amplifier and outputting the amplified output. In an example embodiment, the first amplifier may operate based on a smaller amount of bias current in an auto-zero stage than in the comparison operation stage. Accordingly, an input range may increase as noise is reduced. In an example embodiment, the second amplifier may adaptively control current sources generating a bias current for each operation, and may generate a minimum bias current before and after a decision. Accordingly, power supply fluctuations caused by the operation of the second amplifier may be prevented. In an example embodiment, the first amplifier may include a limiting circuit connecting an output terminal to a common node. The limiting circuit may prevent a voltage level of the common node from being lowered below a minimum value at which the first amplifier may normally operate, and may compensate for voltage fluctuation occurring in the output node.

The comparison circuit 140 may also be configured to output a decision signal (e.g., an output signal of the comparator) at different times according to column line groups.

The counter circuit 150 may include a plurality of counters. Each of the plurality of counters 151 (CNT) may be connected to an output terminal of the comparators 141 and may be configured to count based on the output of each comparator 141. A counter control signal CTCS may include a counter activation signal, a counter clock signal, a counter reset signal for controlling a reset operation of the plurality of counters 151, and an inverting signal for inverting internal bits of each of the plurality of counters. The counter circuit 150 may count a comparison result signal according to the counter clock signal and may output the signal as digital data.

The counter 151 (CNT) may include an up/down counter or a bit-wise counter. In this case, the bit-wise counter may perform an operation similar to that of the up/down counter. For example, the bit-wise counter may perform a function of only up-counting, and may perform a function of inverting entire bits in the counter into 1's complements when a specific signal comes in. The bit-wise counter may perform a reset count and may invert the count into 1's complements, that is, a negative value.

The ramp voltage generator 160 may be configured to generate a ramp voltage (or ADC reference voltage). The ramp voltage generator 160 may operate based on the ramp control signal CTRP provided by a timing controller 170. The ramp control signal CTRP may include a ramp enable signal, a mode signal, and the like. When the ramp enable signal is activated, the ramp voltage generator 160 may generate a ramp voltage RAMP having a slope determined based on the mode signal.

The timing controller 170 may be configured to control operations or timings of the row driver 120, the analog-to-digital conversion circuit 130, and the ramp voltage generator 160 by outputting a control signal or a clock signal to each of the row driver 120, the analog-to-digital conversion circuit 130, and the ramp voltage generator 160. The timing controller 170 may also generate switching control signals provided to the comparison circuit 140 to differentiate the decision speeds depending on a column line group.

The buffer 180 may be configured to temporarily store, amplify and output digital data output by the analog-to-digital conversion circuit 130. The buffer 180 may include a column memory block 181 (MEM) and a sense amplifier circuit 182 (SA).

The column memory block 181 (MEM) may include a plurality of memories. Each of the plurality of memories may temporarily store digital data output by each of the plurality of counters 151 and may output the digital data to the sense amplifier circuit 182.

The sense amplification circuit 182 (SA) may be configured to sense and amplify digital data output by the plurality of memories. The sense amplifier circuit 182 may output the amplified digital data to the digital processing device 190 as image data.

The digital processing device 190 may be configured to perform at least one image processing operation on the obtained image (or the image stored in the memory) and may output the processed image data DATA to an external entity. For example, the at least one image processing operation may include generating a depth map, 3D modeling, generating a panorama, extracting feature points, synthesizing an image, or compensating an image (e.g., reducing noise, adjusting resolution, adjusting brightness, blurring, sharpening, softening). The digital processing device 190 may also perform exposure time control, or readout timing control. The image processed by the digital processing device 190 may be stored back in the memory or may be provided as an external component.

Also, the digital processing device 190 may transmit the entire obtained image or a portion of the obtained image to the security circuit 101 to generate a tag.

Figure 3:
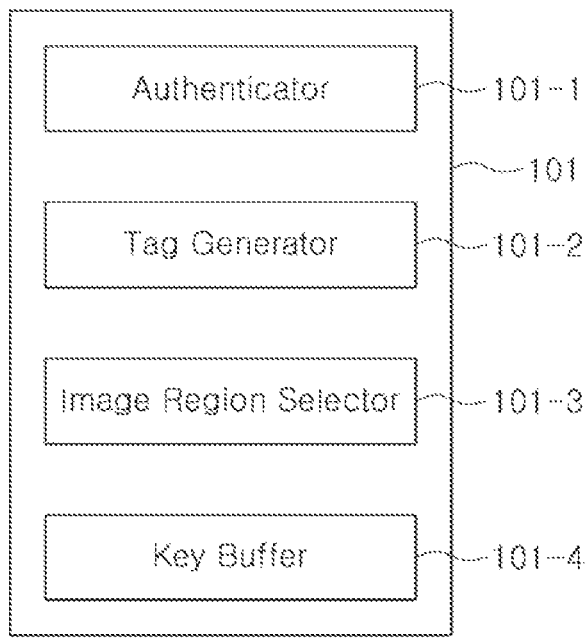
FIG. 3 is a diagram illustrating a security circuit of an automotive image sensor according to an example embodiment.

FIG. 3 is a diagram illustrating a security circuit 101 of an automotive image sensor 100 according to an example embodiment. Referring to FIG. 3, the security circuit 101 may include an authenticator 101-1, a tag generator 101-2, an image area selector 101-3, and a key buffer 101-4.

The authenticator 101-1 may be configured to perform a mutual authentication operation for device authentication with the electronic control unit 200. In an example embodiment, the authenticator 101-1 may perform a challenge-response-based authentication procedure. The authenticator 101-1 may perform a device authentication procedure using a symmetric-key algorithm or an asymmetric-key algorithm.

The tag generator 101-2 may be configured to generate a tag for performing a security processing operation to verify integrity of the image. For example, the tag generator 101-2 may generate a tag through operation on key information and image data. The key information may be key information obtained through consultation with the electronic control unit 200 or having the same information as in the electronic control unit 200. In an example embodiment, the key information may include a session key transmitted and received during a session between the automotive image sensor 100 and the electronic control unit 200.

The image area selector 101-3 may be configured to select an area of an image on which security processing is performed based on area information. For example, such area information may be arbitrarily generated in the automotive image sensor 100. In an example embodiment, data of an area of an image corresponding to the area information may be provided to the tag generator 101-2. In another example embodiment, the area information may be provided from the electronic control unit 200 to the automotive image sensor 100. In an example embodiment, the position of the area of the image selected by the area information may change over time.

The key buffer 101-4 may be configured to store a key value required for an authentication operation. For example, when authentication is performed based on asymmetric-key encryption, the key buffer 101-4 may read out a private key stored in a one time programming (OTP) memory in the security circuit 101, and store the private key, or may store an encryption code (e.g., a key value encrypted using a public key) received from the electronic control unit 200.

Figure 4:
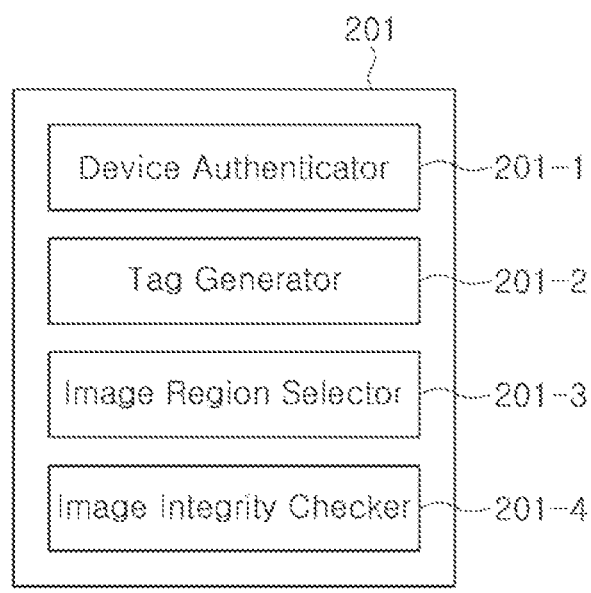
FIG. 4 is a diagram illustrating a security module of an electronic control unit according to an example embodiment.

FIG. 4 is a diagram illustrating a security module 201 of an electronic control unit 200 according to an example embodiment. Referring to FIG. 4, the security module 201 may include a device authenticator 201-1, a tag generator 201-2, an image area selector 201-3, and an image integrity verifier 201-4.

The device authenticator 201-1 may be configured to perform a device authentication procedure with the automotive image sensor 100.

The tag generator 201-2 may generate a tag using data of a selected area from the transmitted image and key information such as a session key.

The image area selector 201-3 may select an image area from the image data DATA transmitted from the automotive image sensor 100, on which security processing may be performed. When the area information is generated in the electronic control unit 200, the image area selector 201-3 may select an image area using pre-owned area information. When the area information is transmitted from the automotive image sensor 100, the image area selector 201-3 may select an image area using the area information transmitted from the automotive image sensor 100.

The image integrity verifier 201-4 may be configured to verify integrity of the transmitted image data IDATA by comparing a tag output by the tag generator 201-2 with a tag transmitted from the automotive image sensor 100.

Figure 5A:
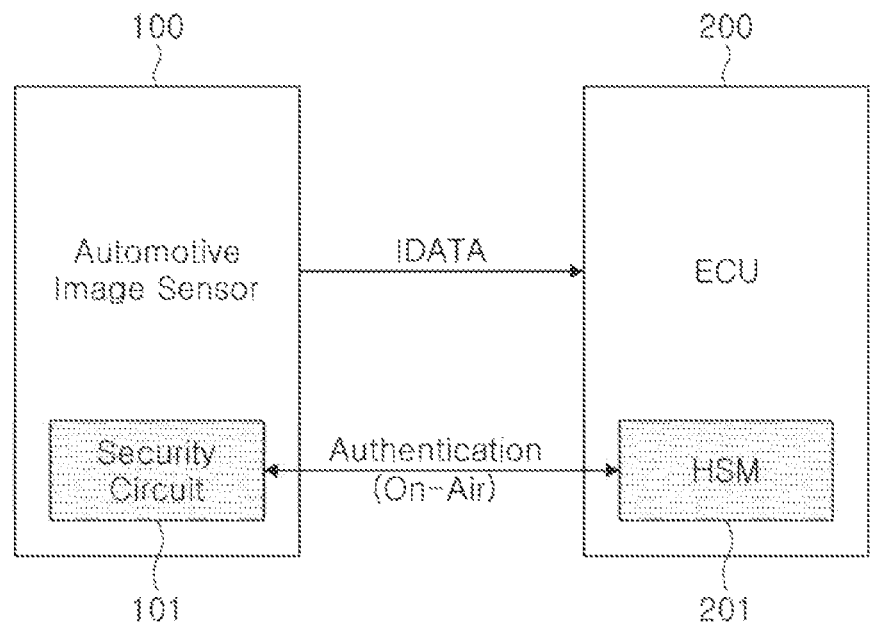
FIG. 5A is a diagram illustrating a process of outputting image data during an authentication operation in an automotive image sensor according to an example embodiment.
Figure 5B:
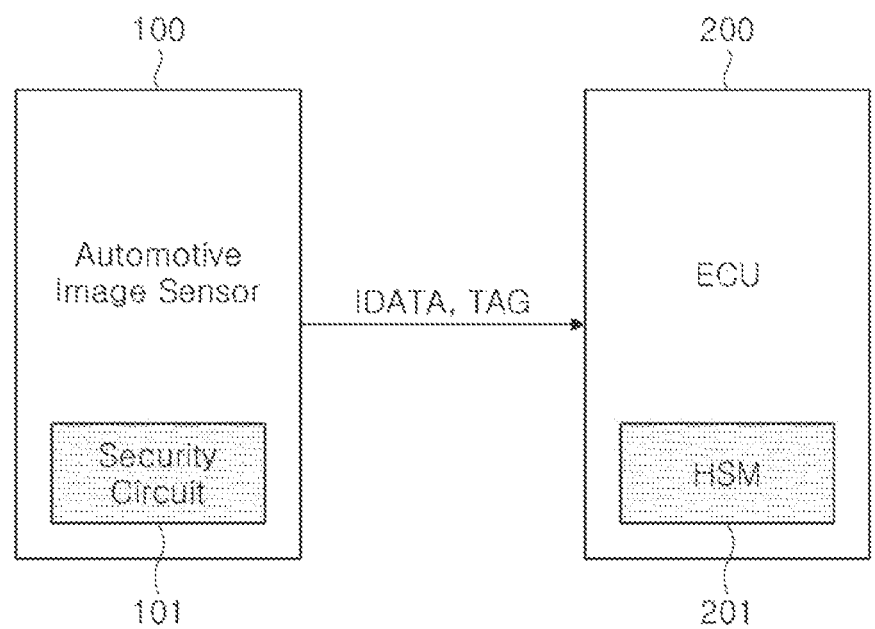
FIG. 5B is a diagram illustrating a process of outputting image data after an authentication operation in an automotive image sensor according to an example embodiment.

FIG. 5A is a diagram illustrating a process of outputting image data IDATA during an authentication operation in an automotive image sensor 100 according to an example embodiment. FIG. 5B is a diagram illustrating a process of outputting image data IDATA after an authentication operation in an automotive image sensor 100 according to an example embodiment.

Referring to FIG. 5A, the security circuit 101 of the automotive image sensor 100 and the security module 201 of the electronic control unit 200 may perform an authentication operation. While the authentication operation is performed, in the on-air state, the automotive image sensor 100 may output the obtained image data IDATA to the electronic control unit 200 for a predetermined period of time. The predetermined time may be selectively set in the electronic control unit 200.

Referring to FIG. 5B, after the authentication operation between the security circuit 101 and the security module 201 is completed, the automotive image sensor 100 may generate a tag TAG corresponding to the obtained image data IDATA using the key information shared in the authentication operation and may output the obtained image data IDATA and the tag TAG to the electronic control unit 200.

Figure 6:
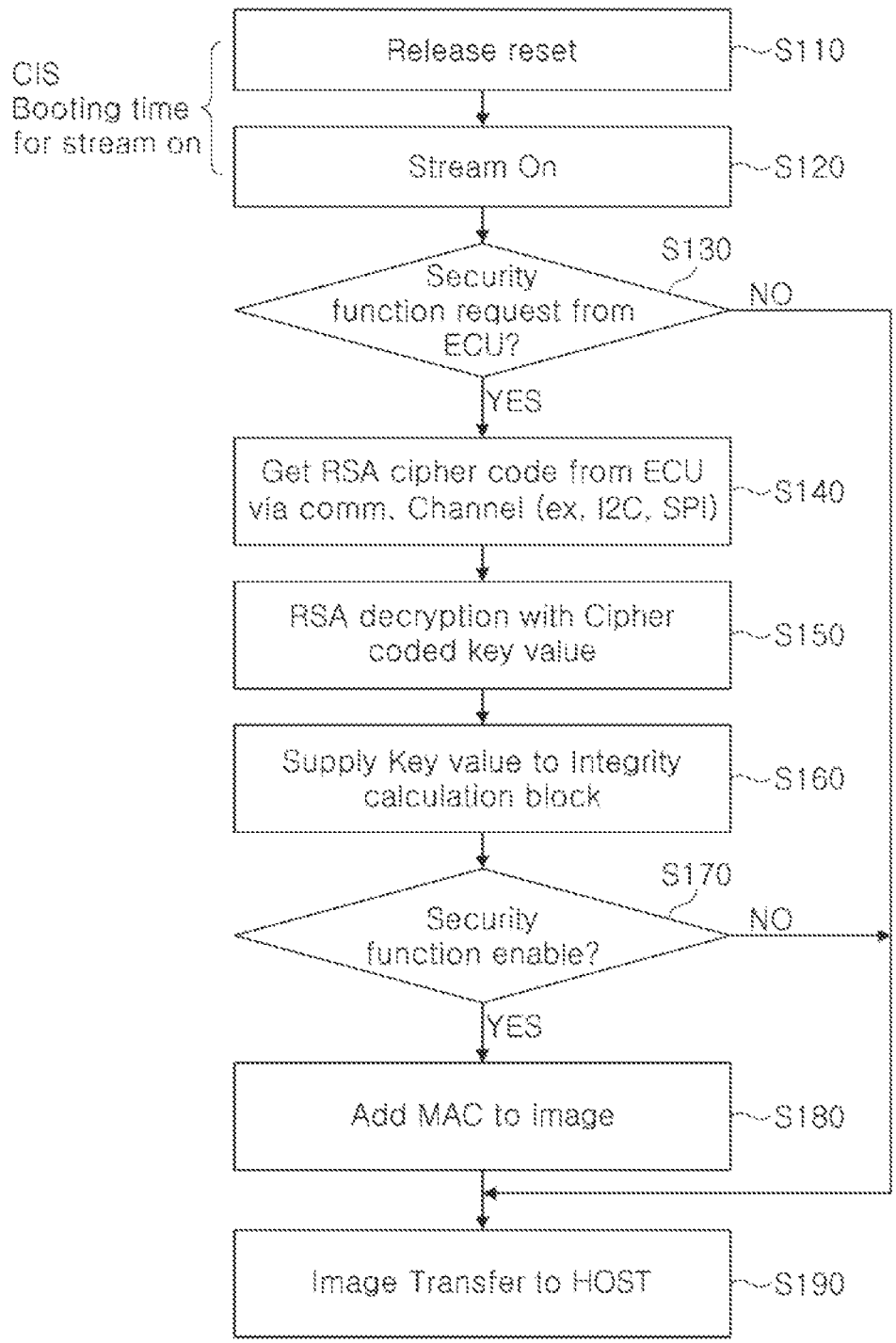
FIG. 6 is a flowchart illustrating an operating method of an automotive image sensor according to an example embodiment.

FIG. 6 is a flowchart illustrating an operating method of an automotive image sensor 100 according to an example embodiment. Referring to FIGS. 1 to 6, the automotive image sensor 100 may operate as below. To use the automotive image sensor 100, a CIS reset operation may be performed. Information related to the automotive image sensor 100 may be basically set as a register according to the CIS reset operation. After the reset operation is completed, the reset operation may be released and ended (S110). Operation S110 may be indicated as a CIS booting time for the stream-on state of the automotive image sensor 100

In this case, the automotive image sensor 100 may perform an operation for obtaining an image. The automotive image sensor 100 may be in a stream-on state for transmitting the obtained image data IDATA, which may be stream data, to the ECU (see FIG. 1, the electronic control unit 200) using a transmission channel (S120). The transmission channel may transmit data according to a mobile industry processor interface (MIPI) standard. However, the transport channel in an example embodiment is not limited thereto. For example, the transmission channel may transmit data by MIPI Automotive SerDes Solution (MASS).

In the stream-on state, that is, while image data IDATA is output, the automotive image sensor 100 may determine whether a security function request has been received from the ECU for device authentication (S130). When there is no security function request from the ECU, the automotive image sensor 100 may transmit the obtained image data IDATA to the ECU that is a host. When there is a security function request from the ECU, the automotive image sensor 100 may obtain the RSA encryption code from the ECU using a communication channel (S140). The communication channel may transmit and receive data according to an inter-integrated circuit (I2C) interface or a serial peripheral interface (SPI). However, the communication channel in an example embodiment is not limited thereto. Thereafter, the automotive image sensor 100 may RSA-decrypt the encryption code with the key value (S150). The decrypted key value may be provided for integrity calculation (S160).

Thereafter, it may be determined whether the security function of the automotive image sensor 100 is activated (S170). When the security function is not activated, the automotive image sensor 100 may transmit the obtained image data IDATA to the ECU as is. When the security function is activated, a message authentication code (MAC) for the image data IDATA obtained using the key value for integrity calculation may be generated (S180). Thereafter, the automotive image sensor 100 may transmit the obtained image data IDATA and the tag TAG corresponding to the MAC to the ECU that is the host (S190).

Figure 7:
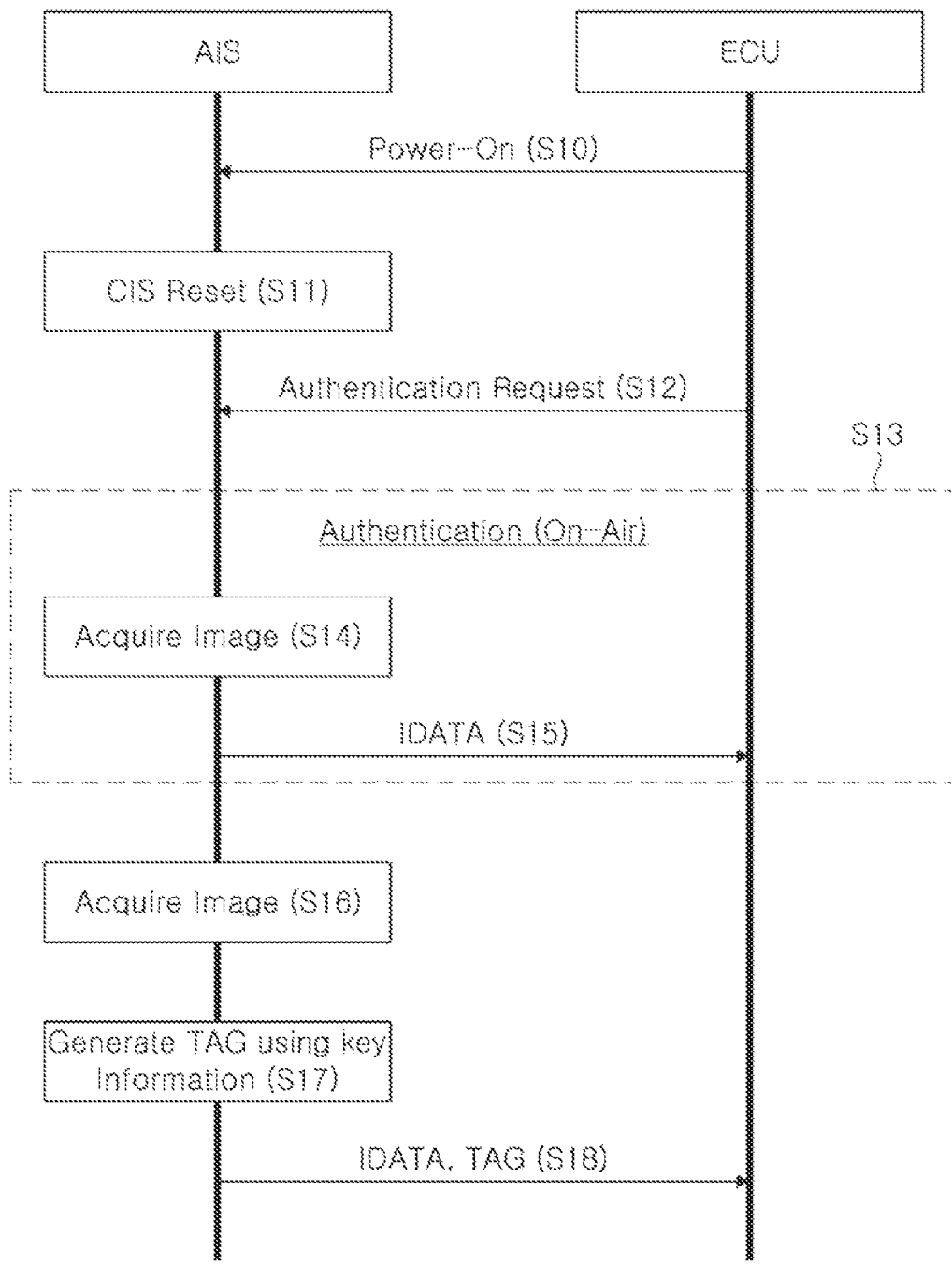
FIG. 7 is a ladder diagram illustrating an operating method of an automotive image sensor according to an example embodiment.

FIG. 7 is a ladder diagram illustrating an operating method of an automotive image sensor 100 according to an example embodiment. Referring to FIG. 7, the image processing system 10 may operate as below.

The ECU (e.g., the electronic control unit 200 in FIG. 1) may supply power to the AIS (e.g., the image sensor 100 for a vehicle in FIG. 1) (S10). The AIS may perform a CIS reset operation (S11). The ECU may transmit an authentication request for performing a device authentication procedure to the AIS (S12). The ECU and the AIS may perform a predetermined authentication operation in response to the authentication request (S13). While the authentication operation is performed, the AIS may obtain an image of the surroundings of the vehicle and may output the obtained image data IDATA to the ECU (S15).

After the authentication operation is completed, the AIS may obtain an image (S16). The AIS may generate a tag (e.g., a MAC value) for the obtained image data using the key information (S17). The key information may correspond to a shared key value according to an authentication operation. Thereafter, the AIS may output the image data IDATA and the tag TAG to the ECU (S18). The ECU may verify integrity of the image data IDATA using the transmitted image data IDATA and the tag TAG, and may output the verified image data to the other devices (e.g, the other ECU, a display device) using a vehicle communication network.

Figure 8:
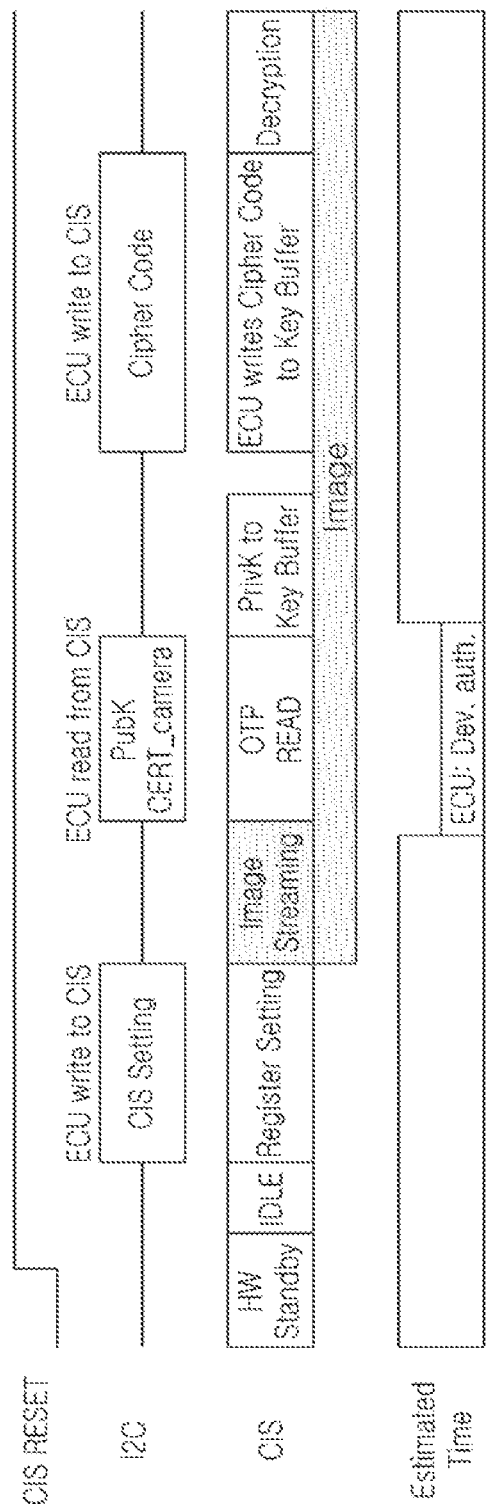
FIG. 8 is a timing diagram illustrating a booting operation of an automotive image sensor according to an example embodiment.

FIG. 8 is a timing diagram illustrating a booting operation of an automotive image sensor 100 according to an example embodiment. Referring to FIG. 8, the booting operation may be performed when the CIS reset signal is at a high level.

Through the I2C channel, the ECU may write information related to the initialization operation in the CIS. Accordingly, the CIS setting operation may be performed. Thereafter, the ECU may read out the public key (PubK CERT_camera) from the CIS for device authentication through the I2C channel. Thereafter, the ECU may write the RSA encryption code in the CIS through the I2C channel.

The CIS may be in a hardware standby state or in an idle state IDLE before a CIS setting operation is performed. In the CIS setting operation period, the CIS may perform register setting for performing an image sensing operation. CIS information according to the register setting may be transmitted to an ECU. When the register setting is completed, the CIS may sense an image. The CIS may instantly output the obtained first image stream to the ECU. As illustrated in FIG. 8, a device authentication operation may be performed while the first image stream is transmitted. The CIS may perform a one time programming OTP read operation to obtain a private key PrivK. Thereafter, the CIS may transmit the private key PrivK to the key buffer. The ECU may write an encryption code in the key buffer of the CIS. The encryption code may include a key value encrypted to a public key PubK CERT_camera of the CIS. The CIS may decrypt the encryption code using the private key PrivK. Accordingly, the CIS may share a key value with the ECU through an authentication operation. Thereafter, the CIS may generate a tag (or MAC value) for the obtained image using the shared key value. As illustrated in FIG. 8, a device authentication operation (ECU: Dev. Auth of the ECU may be performed while image streaming is performed in the CIS after the CIS register is set. Accordingly, the CIS booting time may be shortened.

The image processing system according to an example embodiment may be configured to selectively operate the above-described booting method and the existing booting method.

Figure 9A:
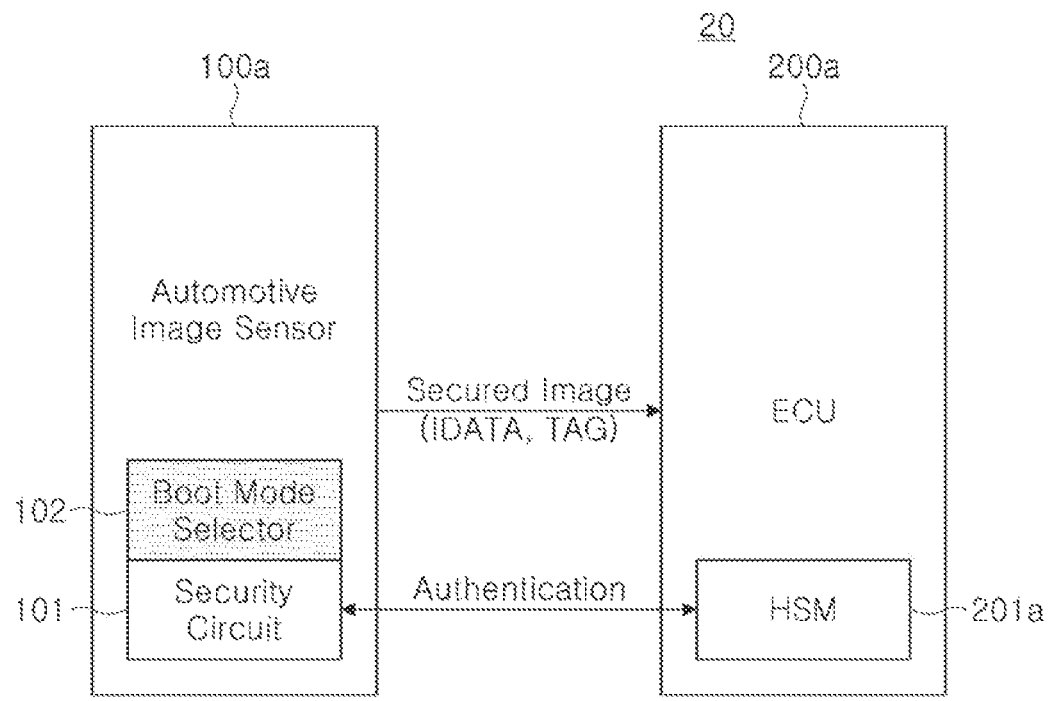
FIGS. 9A and 9B are diagrams illustrating an image processing system according to another example embodiment.
Figure 9B:
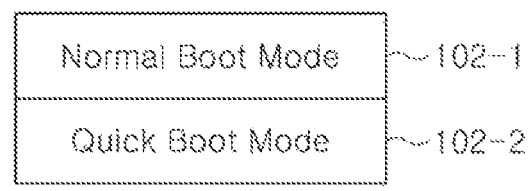

FIGS. 9A and 9B are diagrams illustrating an image processing system 20 according to another example embodiment. Referring to FIG. 9A, the image processing system 20 may include an automotive image sensor 100a and an electronic control unit 200a.

The automotive image sensor 100a may further include a boot mode selector 102 in addition to the example illustrated in FIG. 1. The boot mode selector 102 may select a normal boot mode 102-1 or a quick boot mode 102-2 according to a user's selection as illustrated in FIG. 9B. The normal boot mode 102-1 may indicate a mode for outputting secured image data to the electronic control unit 200a after device authentication according to the existing image sensor booting procedure. The quick boot mode 102-2 may also be configured to instantly transmit the image data IDATA to the electronic control unit 200a while the device authentication operation is performed as described with reference to FIGS. 1 to 8.

The electronic control unit 200a may include a security module 201a (HSM) configured to perform different device authentication operations by communicating with the security circuit 101 of the automotive image sensor 100a according to the selected boot mode. The security module 201a may also perform an integrity verification operation on the received image data IDATA according to a timing corresponding to the selected boot mode.

Figure 10:
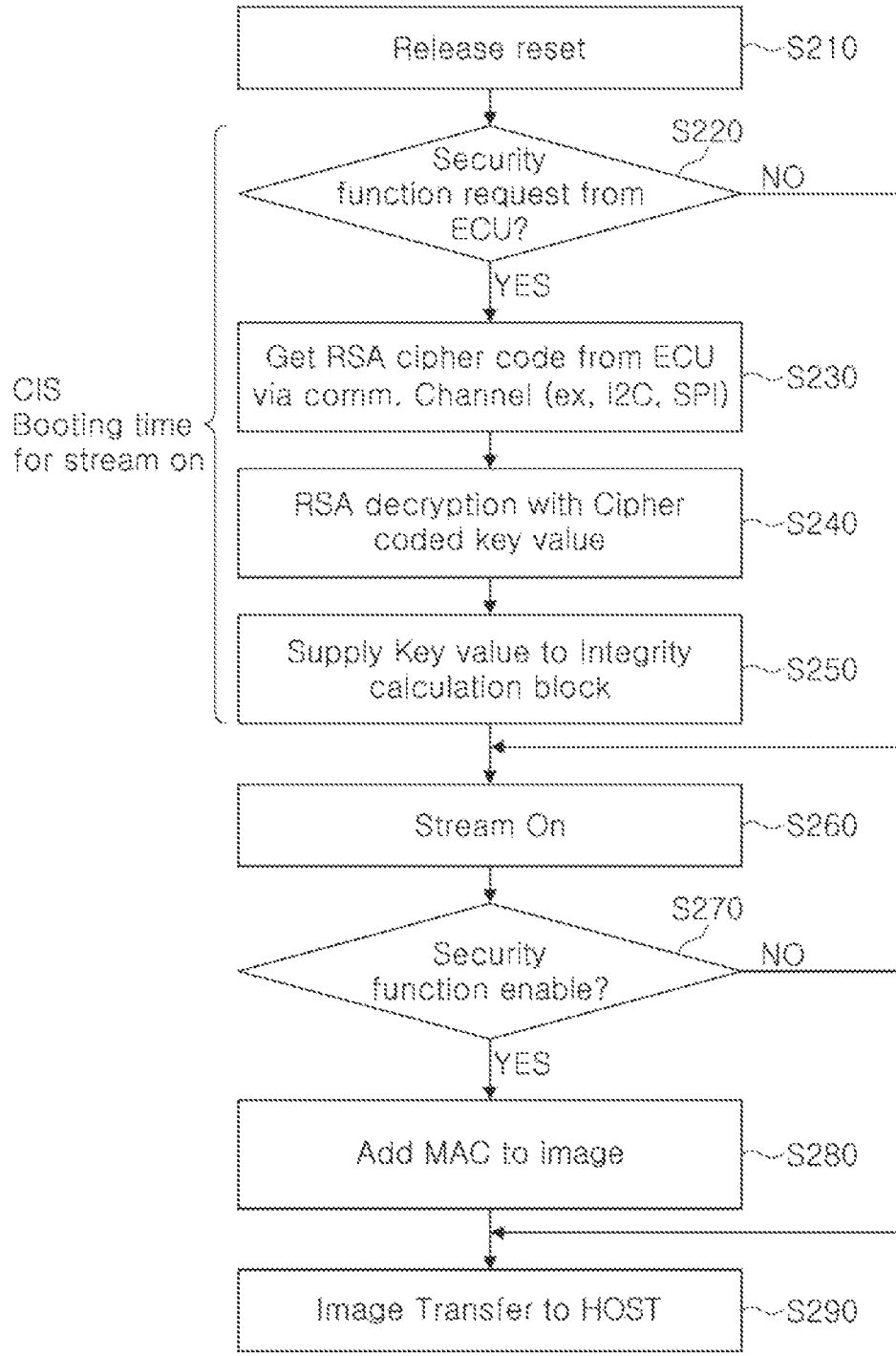
FIG. 10 is a flowchart illustrating an operating method of an automotive image sensor according to another example embodiment.

FIG. 10 is a flowchart illustrating an operating method of an automotive image sensor 100a according to another example embodiment. Referring to FIGS. 9A, 9B, and 10, the automotive image sensor 100a may operate as below. A CIS reset operation may be performed to use the automotive image sensor 100a. Information related to the automotive image sensor 100a may be basically set as a register according to the CIS reset operation. In this case, a normal boot mode may be set as a boot mode. After the reset operation is completed, the reset operation may be released and ended (S210).

The automotive image sensor 100a may determine whether a security function request has been received from the ECU for device authentication (S220). When there is no security function request from the ECU, the automotive image sensor 100a may stream on operation S260 to transmit the obtained image data IDATA to the ECU that is the host. When there is a security function request from the ECU, the automotive image sensor 100a may obtain an RSA encryption code from the ECU using a communication channel (S230). Thereafter, the automotive image sensor 100a may RSA-decrypt the encryption code with the key value (S240). The decrypted key value may be provided for integrity calculation (S250). In this case, the automotive image sensor 100a may maintain a stream-on state in which image stream data may be transmitted to the ECU 200a through the transmission channel (S260). A duration from operation S220 to operation S250, before the stream-on state, may be the CIS booting time.

Thereafter, it may be determined whether the security function of the automotive image sensor 100a is activated (S270). When the security function is not activated, the automotive image sensor 100a may enter operation S290 to transmit the obtained image data IDATA to the ECU as is. When the security function is activated, a message authentication code MAC for the obtained image data IDATA may be generated using the key value for integrity calculation (S280). Thereafter, the automotive image sensor 100a may transmit the obtained image data IDATA and the tag TAG corresponding to the MAC to the ECU that is the host (S290).

Figure 11:
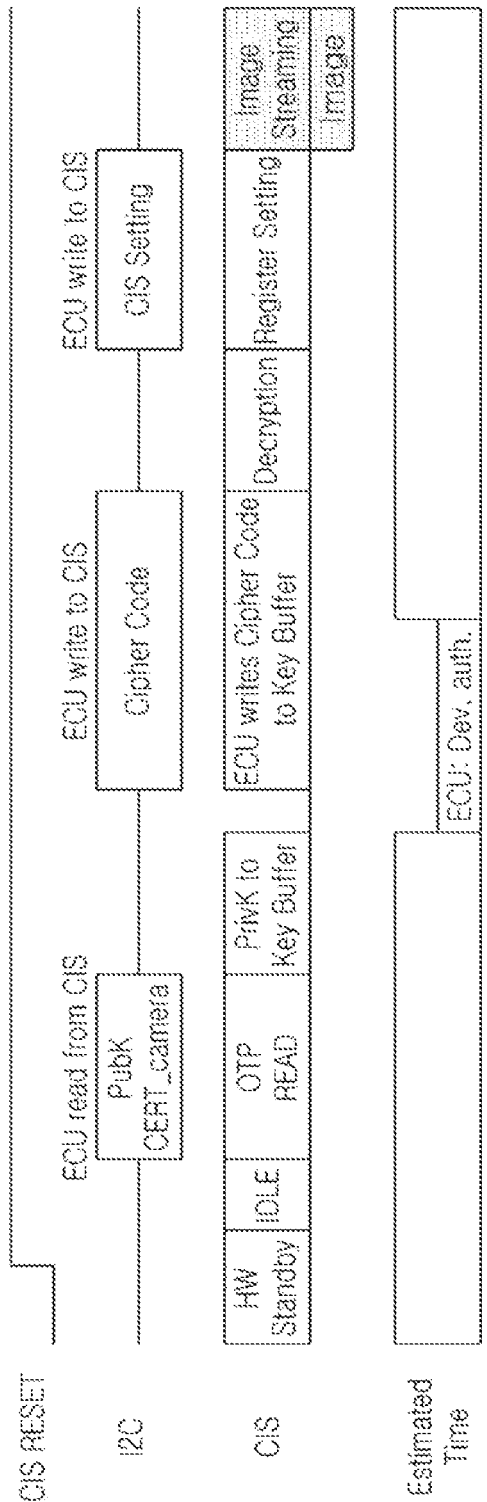
FIG. 11 is a timing diagram illustrating a normal booting operation of an automotive image sensor according to an example embodiment.

FIG. 11 is a timing diagram illustrating a normal booting operation of an automotive image sensor CIS according to an example embodiment. Referring to FIG. 11, a booting operation may be performed when the CIS reset signal is at a high level.

The ECU may read out the public key PubK CERT_camera from the CIS for device authentication through the I2C channel. Thereafter, the ECU may write the RSA encryption code in the CIS through the I2C channel. Thereafter, the ECU may write information related to the initialization operation in the CIS through the I2C channel. Accordingly, the CIS setting operation may be performed.

The CIS may be in a hardware standby state or in an idle state IDLE before a CIS setting operation is performed. The CIS may perform a one time programming OTP read operation to obtain a private key PrivK. Thereafter, the CIS may transmit the private key PrivK to the RSA buffer.

Thereafter, the ECU may write the encryption code in the RSA buffer of the CIS. The CIS may decrypt the encryption code using the private key PrivK. Accordingly, the CIS may share a key value with the ECU through the authentication operation. Thereafter, the CIS may generate a tag or MAC value for the obtained image using the shared key value.

Thereafter, after the CIS completes the register setting internally within the CIS setting section, the CIS may transmit the obtained image to the ECU together with the tag.

As illustrated in FIG. 11, after the device authentication operation ECU: Dev. Auth of the ECU is completed, the CIS setting may be performed, and thereafter, the CIS may safely output image data IDATA and a tag TAG for integrity verification.

Figure 12:
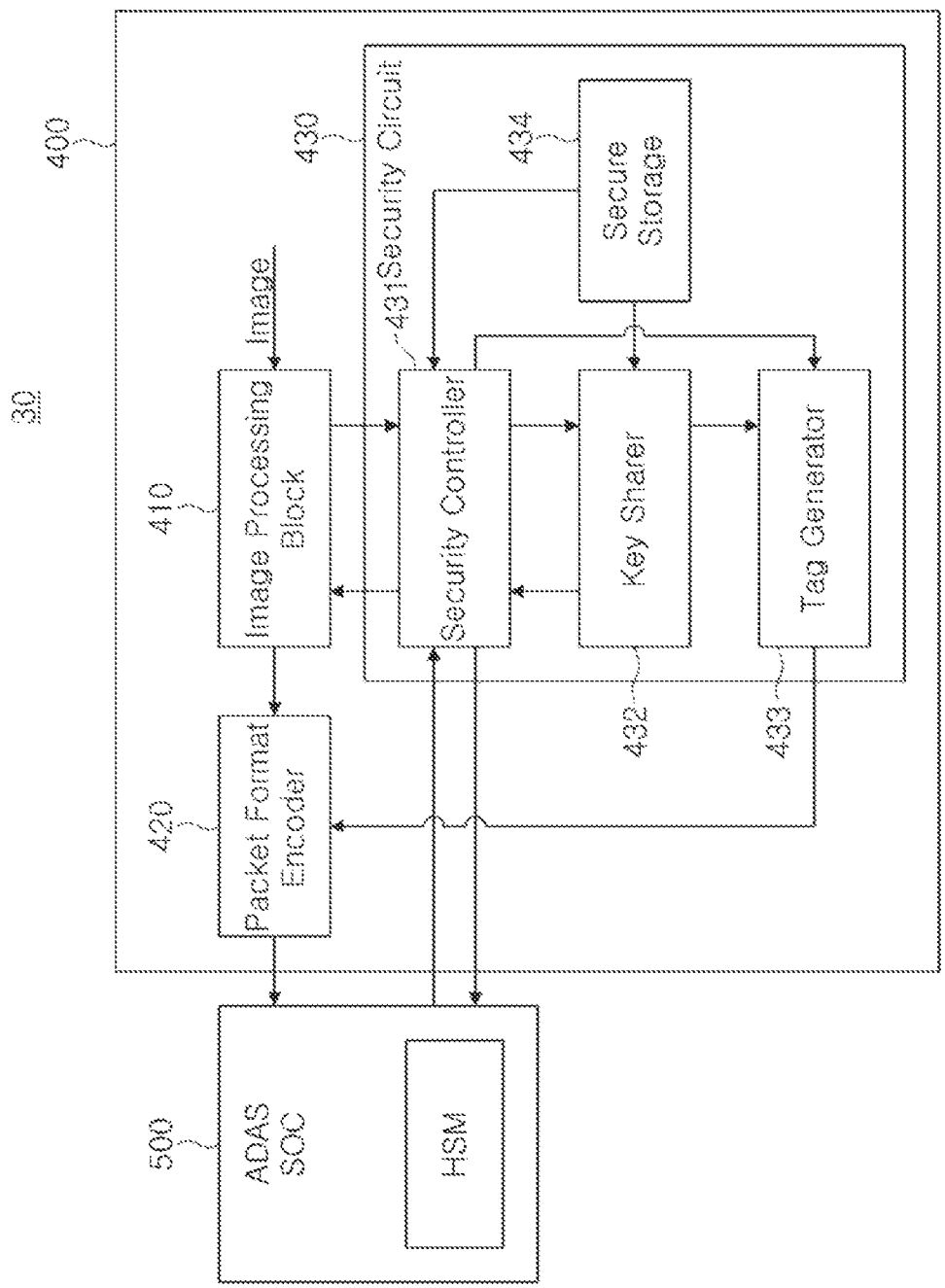
FIGS. 12, 13, 14, and 15 are diagrams illustrating a camera system according to an example embodiment.

FIGS. 12 to 15 are diagrams illustrating a camera system 30 according to an example embodiment. Referring to FIG. 12, the camera system 30 may include a camera device 400 and an advanced driver assistance system (ADAS) SOC 500 configured to receive an image. In FIG. 12, an image from an external entity may be provided to the camera device 400, but the camera device 400 may directly generate an image through an image sensor therein. The camera device 400 may include an image processor 410 configured to process an image and a packet format encoder 420 configured to create a transmission format to transmit an image to the ADAS SOC 500. The image processor 410 may be configured to perform the operation of the digital processing device 190 illustrated in FIG. 2. The camera device 400 may also further include a security circuit 430 for performing device authentication and image authentication in relation to a security function. The security circuit 430 may be configured to perform the function of the security circuit 101 described with reference to FIGS. 1 to 11.

The security circuit 430 may further include a security controller 431 configured to receive a command from and transmit a command to the ADAS SOC 500, a key sharer 432 configured perform a cryptographic operation to generate and exchange a session key between the ADAS SOC 500 and the camera device 400, a tag generator 433 configured to prevent forgery and falsification of the transmitted image and to generate a tag for image authentication, and a secure storage 434 configured to store a pre-shared key or a certificate for device authentication, and an ID.

The ADAS SOC 500 may also include a security/crypto module as a component for processing an image transmitted from the camera device 400, and the security/crypto module may perform the function of the security processing module described in the aforementioned embodiment. The ADAS SOC 500 may also include a packet processing unit configured to decode the received packet, a key storage unit configured to store various key information related to device authentication and image authentication, and an image processing module configured to process image data. The ADAS SOC 500 may be configured to perform an operation of the electronic control unit 200 described in FIGS. 1 to 11.

Functions performed by the components in the example embodiment illustrated in FIG. 12 and the example embodiments below will be further described as below. The image processor 410 may be configured to process an image collected by an image sensor or an image provided from an external entity, and may be configured to transmit data of a specific area of the image to the security controller 431 according to the information (e.g., area information) received from the security controller 431 along with the image processing function in an existing camera device. The packet format encoder 420 may be configured to packetize an image to be transmitted, and may add a code (e.g., MAC) generated for image authentication to a header or a footer of a packet.

The security controller 431 may correspond to a module which may generally manage the security function of the camera device. In an example embodiment, the security controller 431 may send and receive specific information (random challenges, encrypted messages, digital signatures, etc.) through communication with the ADAS SOC 500, may transfer area information indicating a specific position of image data to the image processor 410 and may receive data of the corresponding area, may transfer received data of an image to the tag generator 433, may transmit a session key secured from the key sharer 432 to the tag generator 433 or may transfer a specific value stored in the secure storage unit 434 to the ADAS SOC 500 or may set the value in the key sharer 432.

The key sharer 432 may be configured to decrypt specific area information for an image to which a session key and a MAC transferred by the ADAS SOC 500 are applied. In an example embodiment, a public key encryption system such as RSA or ECC may be applied, or a private key encryption system such as AES may be applied. Also, the ADAS SOC 500 may generate a key and may transmit the key to the camera device 400, or the ADAS SOC 500 and the camera device 400 may share a session key using a key exchange protocol such as DH and EC-DH. The decrypted session key and area information may be transmitted to the security controller 431 or the tag generator 433.

The tag generator 433 may perform a MAC operation on the image data received from the security controller 431 using a session key received from the key sharer 432. As a result of the operation, the MAC value may be transmitted to the packet format encoder 420 and may be transmitted to the ADAS SOC 500.

The secure storage unit 434 may be configured as a storage circuit for safely storing a private/public key pair of the camera device 400 and a certificate, or a pre-shared key shared in advance between the camera device 400 and the ADAS SOC 500. As the ID of the camera device 400, a value which may be public but not forged may be stored in the secure storage unit 434.

The ADAS SOC 500 may include a main processor responsible for autonomous driving in automotive products. In the example embodiment, since an automotive product is described as an example, the entity may be defined as an ADAS SOC, but the ADAS SOC 500 may be configured as an entity for processing, analyzing, and storing an image transmitted by the camera device 400.

Various components of the camera device 400 illustrated in FIG. 12 may be configured in various manners. In an example embodiment, a processor configured to execute programs in the camera device 400 may be further provided, and the processor may execute programs stored in an operation memory in the camera device 400 in FIG. 12 such that functions of various components illustrated in FIG. 12 may be performed. In another example embodiment, various components in the camera device 400 may include circuits performing corresponding functions, such that the functions thereof may be performed in hardware, or various components provided in the camera device 400 may be configured by a combination of hardware and software.

Figure 13:
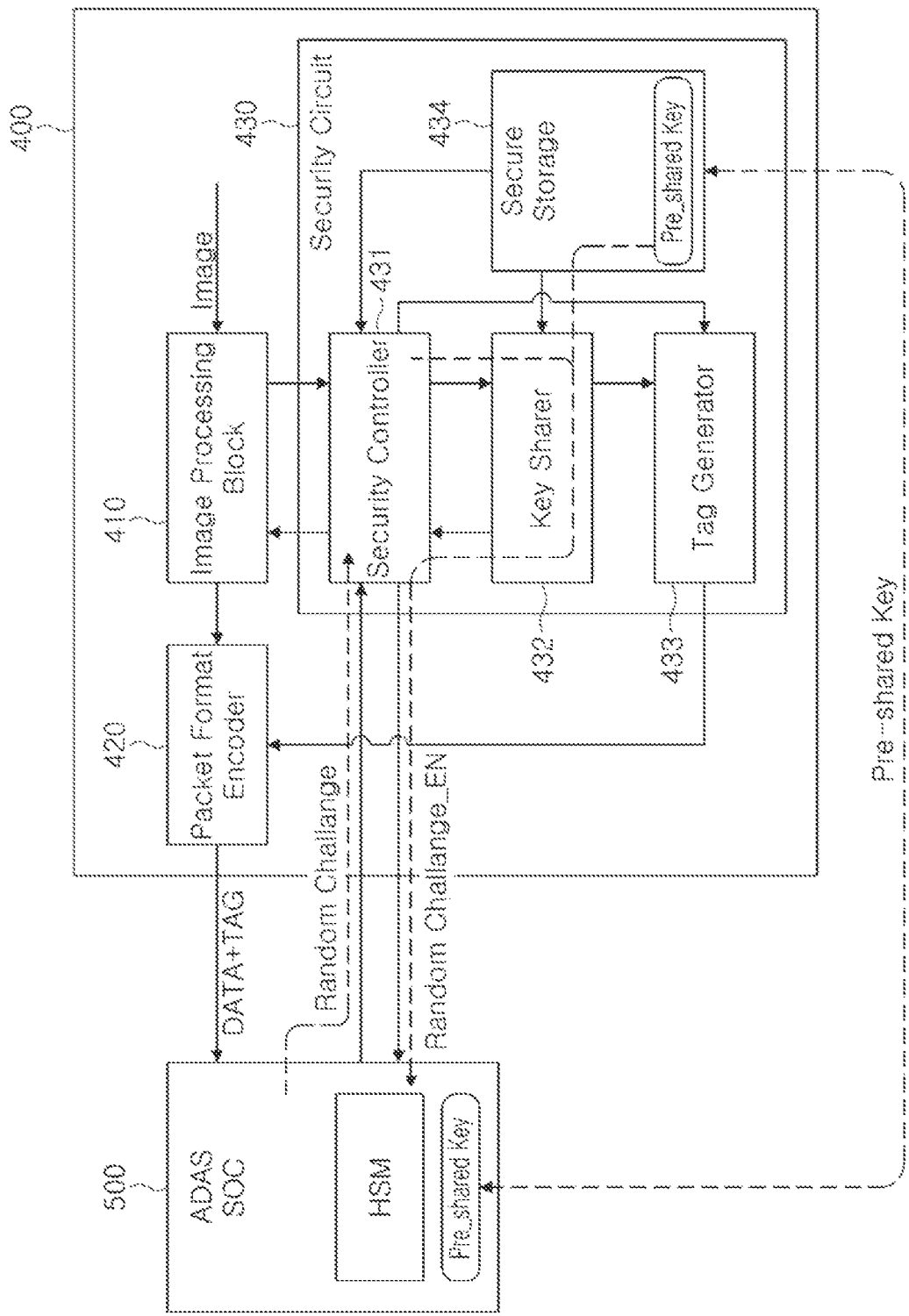

In the description below, more specific operations of the camera system 30 illustrated in FIG. 12 will be described. FIG. 13 is a diagram illustrating the example in which the camera device 400 and the ADAS SOC 500 may perform device authentication using a pre-shared key. In an example embodiment, the camera device 400 and the ADAS SOC 500 may perform a challenge-response-based authentication procedure. The authentication procedure may be performed by the ADAS SOC 500 confirming that the camera device 400 is a legitimate device, which may be available by confirming ownership of an existing shared key (e.g., a pre-shared key). This method may be performed in the order as below.

Each of the camera device 400 and the ADAS SOC 500 may possess a pre-shared key. The pre-shared key may be configured as a key of a block cipher such as advanced encryption standard (AES), and the ADAS SOC 500 and the camera device 400 may share the same key, and may need to be safely stored in the secure storage 434 of the camera device 400.

In an example embodiment, the ADAS SOC 500 may determine whether the camera device 400 possesses a pre-shared key based on a challenge-response scheme to confirm that the camera device 400 is a legitimate device. To this end, the ADAS SOC 500 may generate a random challenge having a random value (e.g., a random number of a predetermined number of bits) and may transmit the value to the camera device 400.

The camera device 400 receiving the random challenge may encrypt the random challenge using the pre-shared key stored in the secure storage 434, and may transmit the encrypted random challenge Random Challenge_EN back to the ADAS SOC 500. In this case, in addition to the random challenge Random Challenge_EN, public information such as a product number (ID) of the camera device 400, which may distinguish the camera device 400, may be further transmitted to the ADAS SOC 500.

The ADAS SOC 500 may store the product number (ID) information of the camera device 400 in advance, and may decrypt the encrypted text received from the camera device 400 using a pre-shared key, may determine whether the decrypted plaintext is the same as the random challenge transmitted by the ADAS SOC 500, and may also determine whether the product number (ID) received from the camera device 400 is the same as the pre-stored information. According to the determination result, the camera device 400 having the pre-shared key may be authenticated as a legitimate device.

As for the pre-shared key, the same key may be used for each camera device 400, or a different key may be used for each device. When a different key is used for each device, the ADAS SOC 500 may include a database in which a product ID and keys of the camera device 400 are arranged.

Figure 14:
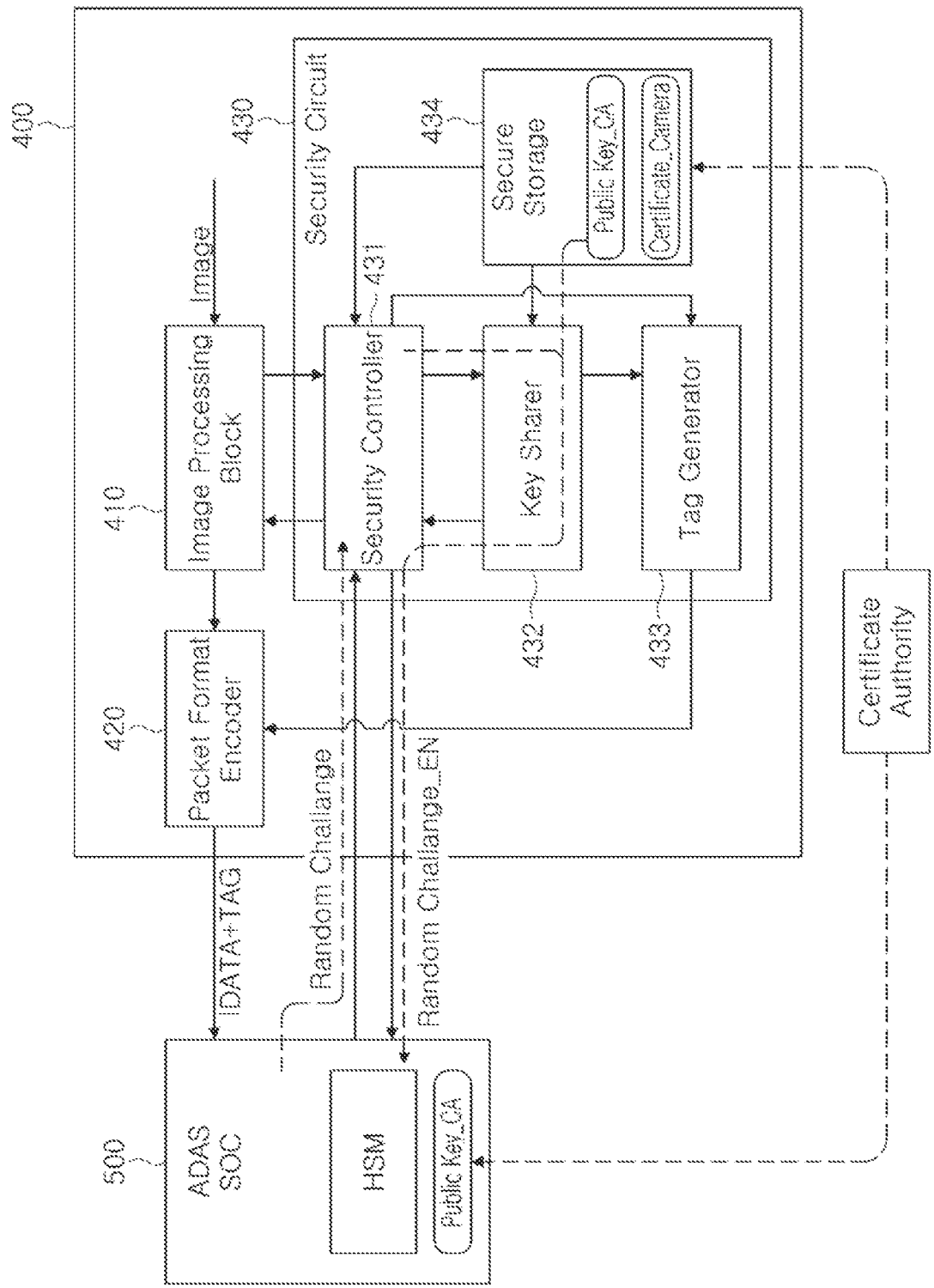

FIG. 14 is a diagram illustrating the example in which a camera device and an ADAS SOC may perform device authentication by a public key cryptosystem. As for the authentication method using a public key cryptosystem, it may not be necessary to share a key in advance, and only one product may revoke even when a private key is exposed. In an example embodiment, a certificate authority (CA) may be required to apply the public key encryption system. The authentication method based on the public key encryption system may be performed in the order as below.

The certification authority (CA) may transmit the public key (e.g., the certification authority public key Public Key_CA) to the ADAS SOC 500, and may issue a certificate for the private key of the camera device 400. In an example embodiment, to confirm that the camera device 400 is a legitimate device, the ADAS SOC 500 may determine whether the camera device 400 processes a private key based on a challenge-response scheme. To this end, the ADAS SOC 500 may generate a challenge-response and may transmit the challenge-response to the camera device 400.

The camera device 400 receiving the challenge-response may digitally sign the challenge-response using a private key stored in the secure storage unit 434, and may transmit the digitally signed challenge-response to the ADAS SOC 500. In this case, the camera device 400 may also transmit a certificate thereof to the ADAS SOC 500.

Figure 15:
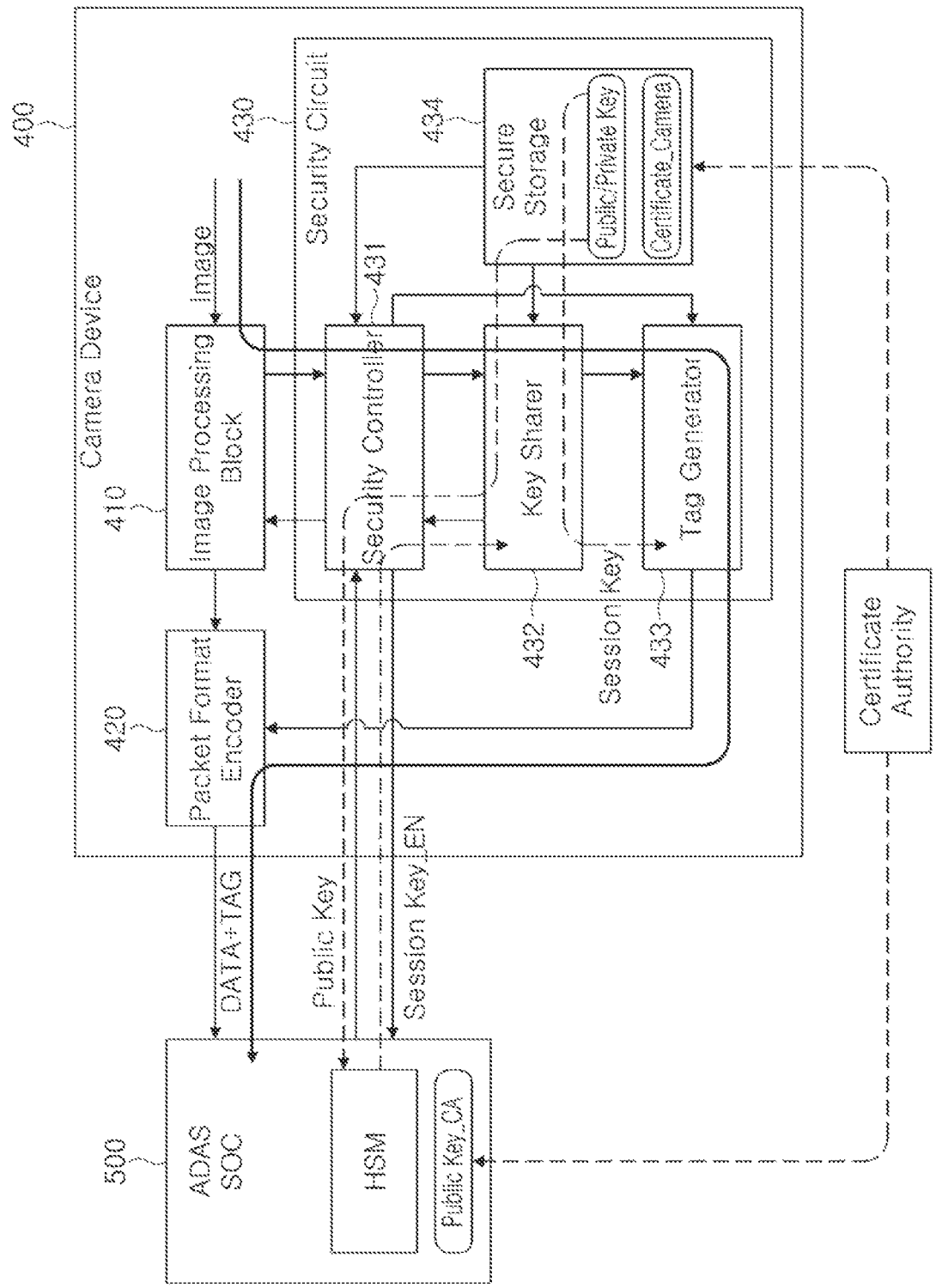

The ADAS SOC 500 may verify the certificate transmitted by the camera device 400 with the certification authority public key Public Key_CA of the camera device 400 to secure the public key of the camera device 400, may verify the digital signature transmitted by the camera device 400 using the key, and may determine whether the camera device 400 is a legitimate device according to the verification result FIG. 15 is a diagram illustrating the example in which the camera device and the ADAS SOC perform device authentication through transmission of a session key and a subsequent processing. Device authentication according to the session key method may be performed through a method partially similar to the authentication method using the above-described public key cryptosystem. When the ADAS SOC 500 generates a session key, encrypts the session key into a public key of the camera device 400 and transmits the key, the camera device 400 may decrypt the information provided from the ADAS SOC 500 to a private key thereof and may secure a session key, and may perform communication using the session key. Accordingly, since only the legitimate camera device 400 holding the private key may normally perform the subsequent operation, whether the device is a legitimate device may be confirmed by whether the subsequent communication is normally performed without a separate authentication process.

Similarly to the above-described public key encryption method, the ADAS SOC 500 may secure and verify the certificate of the camera device 400, thereby securing the public key of the camera device 400. The ADAS SOC 500 may also generate a session key, may encrypt the key into a public key of the camera device 400, and may transmit the key to the camera device 400. The camera device 400 may secure a session key by decrypting the encrypted text transmitted as a private key thereof. Thereafter, a corresponding session key may be used to authenticate an image, and the ADAS SOC 500 may authenticate that the camera device 400 is a legitimate device when image authentication is normally performed.

As in the example embodiments, after device authentication is normally performed, image authentication using at least a portion of an image and a session key may be performed. When device authentication fails, the ADAS SOC 500 may perform a process such as stopping communication with the camera device for which device authentication has failed, or discarding an image transmitted from the camera device.

Figure 16:
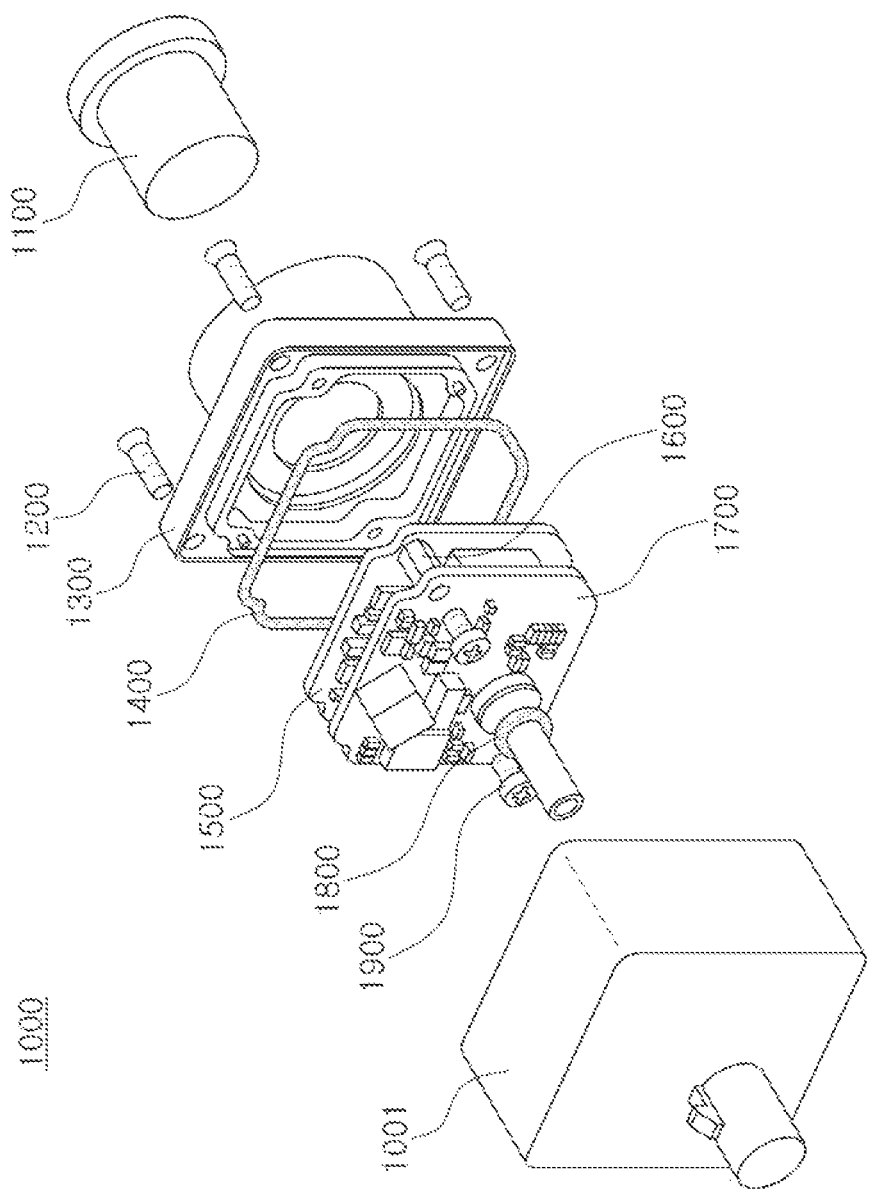
FIG. 16 is a perspective diagram illustrating an automotive camera device according to an example embodiment.

FIG. 16 is a perspective diagram illustrating an automotive camera device 1000 according to an example embodiment. Referring to FIG. 16, the vehicle camera device 1000 may include a first shell 1001, a lens 1100, a first screw 1200, a second shell 1300, a sealing ring 1400, an image sensor board 1500, a cooper pillar 1600, a serializer board 1700, a ring 1800, and a second screw 1900. The image sensor board 1500 may be configured to include the automotive image sensor described with reference to FIGS. 1 to 15.

At least one of the components, elements, modules or units (collectively "components" in this paragraph) represented by a block in the drawings may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The image processing system according to example embodiments may receive a cybersecurity key from a host after a reset operation in the automotive CIS and may perform a security operation, and the booting time may be reduced by eliminating the key receiving time.

According to the aforementioned example embodiments, an automotive image sensor, an image processing system including the same, and an operating method thereof may, by instantly outputting image data obtained while performing device authentication, reduce the booting time and perform fast booting.

The automotive image sensor, an image processing system including the same, and an operating method thereof in an example embodiment may also improve user convenience by instantly outputting image data through the fast booting.

While example embodiments have been illustrated and described above, it will be apparent to those skilled in the art that modifications and variations could be made without departing from the scope of the present disclosure as defined by the appended claims and their equivalents.

What is claimed is:
1. A method of operating an automotive image sensor, the method comprising:
    performing a reset operation to set an initialization register corresponding to operation information of the automotive image sensor;
    receiving a device authentication request from an electronic control unit after performing the reset operation;
    performing an authentication operation with the electronic control unit based on the device authentication request;
    obtaining first image data while performing the authentication operation;
    transmitting the first image data to the electronic control unit while performing the authentication operation;
    obtaining second image data after the authentication operation is completed;
    generating a tag for the second image data; and
    transmitting the second image data and the tag to the electronic control unit.

2. The method of claim 1, further comprising:
    ending the reset operation after setting the initialization register is completed.
3. The method of claim 2, wherein the transmitting the first image data comprises transmitting the first image data to the electronic control unit after releasing the reset operation.
4. The method of claim 2, wherein the performing the authentication operation comprises performing the authentication operation based on a challenge-response scheme.
5. The method of claim 1, wherein the performing the authentication operation comprises performing the authentication operation based on an asymmetric-key encryption algorithm.
6. The method of claim 1, wherein the performing the authentication operation comprises:
    receiving a secure function request from the electronic control unit;
    receiving a Rivest Shamir Adleman (RSA) encryption code from the electronic control unit based on a communication channel; and
    decrypting the RSA encryption code based on a private key to obtain a key value.
7. The method of claim 6, wherein the generating the tag comprises generating the tag corresponding to the second image data based on the key value.
8. The method of claim 7, wherein the tag comprises a message authentication (MAC) value for all of the second image data or a portion of the second image data.
9. The method of claim 6, wherein the performing the authentication operation comprises reading the private key from a one-time programming (OTP) memory.
10. The method of claim 1, wherein the authentication operation is performed by an inter-integrated circuit (I2C) interface or a serial peripheral interface (SPI) between the automotive image sensor and the electronic control unit, and
    wherein the operation of transmitting the first image data and the second image data is performed by a mobile industry processor interface (MIPI) automotive SerDes solution (MASS).
11. An automotive image sensor comprising:
    a pixel array comprising a plurality of pixels provided in a plurality of row lines and a plurality of column lines;
    a row driver configured to select one of the plurality of row lines;
    an analog-to-digital conversion circuit configured to convert analog signals output by the pixel array into digital data by comparing the analog signals with a ramp signal;
    a ramp signal generator configured to generate the ramp signal;
    a buffer memory configured to store the digital data;
    a digital processing device configured to process the digital data into image data;
    a timing controller configured to control the pixel array, the row driver, the analog-to-digital conversion circuit, the ramp signal, the buffer memory, and the digital processing device; and
    a security circuit configured to perform device authentication with an external electronic control unit and to generate a tag for all of the image data or a portion of the image data based on key information corresponding to the device authentication,
    wherein the digital processing device transmits the image data to the electronic control unit while performing the device authentication.

12. The automotive image sensor of claim 11, wherein the digital processing device is further configured to transmit the image data and the tag to the electronic control unit after performing the device authentication.

13. The automotive image sensor of claim 11, wherein the security circuit is further configured to perform the device authentication based on a Rivest Shamir Adleman (RSA) encryption algorithm.

14. The automotive image sensor of claim 11, wherein the security circuit comprises:
   an authenticator configured to perform device authentication based on the electronic control unit and an asymmetric-key encryption algorithm;
   a tag generator configured to generate the tag corresponding to the image data based on a key value shared based on the device authentication; and
   an image area selector configured to select a portion of the image data required to generate the tag.

15. The automotive image sensor of claim 14, wherein the asymmetric-key encryption algorithm is configured as a Rivest Shamir Adleman (RSA) encryption algorithm, and
   wherein the security circuit is further configured to:
      transmit a public key to the electronic control unit based on a device authentication request of the electronic control unit;
      receive an RSA encryption code from the electronic control unit; and
      obtain the key value by decrypting the RSA encryption code based on a private key.

16. An image processing system comprising:
   an automotive image sensor configured to obtain an image, the automotive image sensor comprising:
      a boot mode selector configured to select one of a normal boot mode and a quick boot mode; and
   an electronic control unit configured to receive image data from the automotive image sensor and to process the image data,
   wherein the electronic control unit comprises:
      a security module configured to perform device authentication based on the automotive image sensor and verify integrity of the image data received from the automotive image sensor,
   wherein, in the normal boot mode, an initial setting operation of the automotive image sensor is requested after the device authentication is performed by the automotive image sensor, and
   wherein, in the quick boot mode, the initial setting operation of the automotive image sensor is requested while the device authentication is being performed by the automotive image sensor.

17. The image processing system of claim 16, wherein the electronic control unit is further configured to:
   read a public key of the automotive image sensor through a communication channel;
   transmit a Rivest Shamir Adleman (RSA) encryption code corresponding to the public key to the automotive image sensor through the communication channel; and
   request the initial setting operation to the automotive image sensor, in the normal boot mode.

18. The image processing system of claim 17, wherein the communication channel is implemented as an inter-integrated circuit (I2C) interface or a serial peripheral interface (SPI).

19. The image processing system of claim 16, wherein the electronic control unit is further configured to:
   request the initial setting operation of the automotive image sensor through a communication channel;
   read a public key of the automotive image sensor through the communication channel; and
   transmit a Rivest Shamir Adleman (RSA) encryption code corresponding to the public key to the automotive image sensor through the communication channel, in the quick boot mode.

20. The image processing system of claim 16, wherein the electronic control unit is further configured to receive the image data from the automotive image sensor based on a mobile industry processor interface (MIPI) automotive SerDes solution (MASS) standard.

* * * * *